(12) United States Patent
Bruyninckx

(10) Patent No.: US 11,333,297 B2
(45) Date of Patent: May 17, 2022

(54) DEVICE FOR STRENGTHENING AND RIGGING TRUSSES AND METHOD IN WHICH SUCH DEVICE IS APPLIED

(71) Applicant: Willy Bruyninckx, Herselt (BE)

(72) Inventor: Willy Bruyninckx, Herselt (BE)

( * ) Notice: Subject to any disclaimer, the term of this patent is extended or adjusted under 35 U.S.C. 154(b) by 0 days.

(21) Appl. No.: 16/765,753

(22) PCT Filed: Nov. 14, 2018

(86) PCT No.: PCT/IB2018/058945
§ 371 (c)(1),
(2) Date: May 20, 2020

(87) PCT Pub. No.: WO2019/097415
PCT Pub. Date: May 23, 2019

(65) Prior Publication Data
US 2020/0292126 A1    Sep. 17, 2020

(30) Foreign Application Priority Data

Nov. 20, 2017 (BE) .................................. 2017/5846

(51) Int. Cl.
*E04H 12/10* (2006.01)
*F16M 13/02* (2006.01)
*E04B 1/19* (2006.01)
*E04C 3/02* (2006.01)

(52) U.S. Cl.
CPC ............. *F16M 13/02* (2013.01); *E04B 1/19* (2013.01); *E04C 3/02* (2013.01); *E04B 2001/196* (2013.01); *E04B 2001/1927* (2013.01)

(58) Field of Classification Search
CPC ..... E04C 2003/0495; E04C 2003/0486; E04H 12/10; E01F 9/696; A63J 15/00
USPC ................................................ 52/638, 653.2
See application file for complete search history.

(56) References Cited

U.S. PATENT DOCUMENTS

| | | | |
|---|---|---|---|
| 1,939,598 A * | 12/1933 | Ragsdale | B64C 1/08 52/650.1 |
| 5,826,384 A | 10/1998 | O'Neill | |
| 6,079,178 A | 6/2000 | Fisher | |
| 6,082,068 A | 7/2000 | Fisher | |
| 6,615,562 B2 * | 9/2003 | Fritsche | A47F 5/105 52/690 |
| 7,069,681 B2 * | 7/2006 | Noble | G09F 7/18 40/490 |
| 8,707,653 B2 * | 4/2014 | Calleja | E04B 1/2403 52/655.1 |

(Continued)

FOREIGN PATENT DOCUMENTS

| DE | 19714996 A1 | 10/1998 |
|---|---|---|
| EP | 1079039 A | 2/2001 |
| FR | 3025539 A | 3/2016 |

OTHER PUBLICATIONS

International Search Report and Written Opinion, dated Jan. 4, 2019, from corresponding PCT application No. PCT/IB2018/058945.

*Primary Examiner* — Babajide A Demuren
*Assistant Examiner* — Daniel J Kenny
(74) *Attorney, Agent, or Firm* — Nixon & Vanderhye

(57) ABSTRACT

A device for strengthening and/or rigging trusses includes at least two connecting elements, which connect at least two parallel truss pipes of the truss. On these connecting elements an attachment unit provided between at least one pair of truss pipes, to which mounting structures can be attached.

8 Claims, 6 Drawing Sheets

(56) References Cited

U.S. PATENT DOCUMENTS

| | | | |
|---|---|---|---|
| 8,978,338 B2 | 3/2015 | Jobin et al. | |
| 9,435,060 B2 * | 9/2016 | Woods | B29C 53/58 |
| 9,637,922 B1 * | 5/2017 | Cook | E04B 1/1903 |
| 9,828,772 B2 * | 11/2017 | Murphey | E04C 3/005 |
| 9,995,430 B2 * | 6/2018 | Miller | A63J 1/02 |
| 10,155,527 B2 * | 12/2018 | Hossler | B62B 3/16 |
| 10,570,607 B2 * | 2/2020 | Stapleton | E04B 1/99 |
| 2011/0308189 A1 * | 12/2011 | Daas | E04G 11/48 |
| | | | 52/646 |

* cited by examiner

PRIOR ART

DEVICE FOR STRENGTHENING AND RIGGING TRUSSES AND METHOD IN WHICH SUCH DEVICE IS APPLIED

BACKGROUND OF THE INVENTION

Field of the Invention

The present invention relates to a device to strengthen and rig trusses and a method in which such device is applied.

More specifically, the invention is intended to strengthen and rig trusses, which consist of two or more parallel truss pipes, between which cross members have been mounted by way of strengthening.

Description of the Related Art

These trusses are used to build temporary structures such as a support structure in a sales area or on a stage for example, consisting of upstanding trusses, usually connected with each other by horizontal trusses at the top.

On a stage such trusses are used to attach all kinds of objects to such as spotlights for lighting, loudspeakers for sound reproduction, pipes and others, sometimes movable ornaments which are required for a performance on the stage.

In a sales area for example, such trusses are also used to suspend lighting elements, publicity panels or other devices such as loudspeakers and their wires.

It is known that the attached objects are usually suspended directly from the truss pipes or their cross members, by means of clamps, hooks or improvised attachments such as cords or metal wire.

A problem that presents itself here, is that on traditional trusses no mounting structures are provided to attach all kinds of objects, some of which have a considerable weight, such that the attachment cannot always be relied on and the trusses or cross members can be subjected to loads for which they were not designed, which compromises the safety of the temporary structure built therewith.

SUMMARY OF THE INVENTION

The purpose of the present invention is to provide a solution to the aforementioned and other disadvantages, by providing a device which allows trusses, from which objects are suspended or attached, to be strengthened and provided with mounting structures to which these objects can be attached.

To this end, the invention relates to a device for strengthening and/or rigging trusses, comprising at least two connecting elements, which connect at least two parallel truss pipes of the truss, whereby on these connecting elements, attachment means are provided between at least one pair of truss pipes, on which mounting structures can be attached.

The term "volume of a truss" is understood to mean the volume enclosed by at least two or more truss pipes of the truss itself within which the cross members between these two or more truss pipes of the truss are located.

An advantage of these connecting elements is that the attachment means provided thereon allow all kinds of mounting structures to be attached to the truss, to which objects such as spotlights, loudspeakers or wires can be fastened.

Preferably, the mounting structures are located entirely outside the volume of the truss and are attached by means of terminal connectors of any kind to the provided attachment means of the connecting elements.

The advantage of this set-up is that the original cross members between the two or more truss pipes of the truss itself are retained and all suspended objects can be attached to the mounting structures without directly loading or damaging the truss itself.

In a variant embodiment the original cross members between the two or more truss pipes of the truss itself are not retained, but are replaced by one or more intermediate virtual planes parallel with the connecting elements, whereby these planes are formed by mechanical double clamps between each pair of the two or more truss pipes, which hold the two or more truss pipes of the truss at an equal distance from each other.

The advantage of this set-up is that it can be realised with mechanical double clamps, as is customary in scaffolding, whereby the mounting structures, which are located entirely outside the volume of the truss, can consist of scaffolding pipes which are themselves part of a scaffolding which can be used as a support, for example when working on a façade.

In another variant embodiment the mounting structures are only partly outside the volume of the truss and are attached with any kind of connectors to the provided attachment means of the connecting elements.

This set-up offers the advantage that the mounting structures use up less space by utilising part of the volume between the two or more truss pipes of the truss, such that the resulting structure is more compact.

The part of the volume that is utilised by the mounting structures, can become so big that the original cross members between the two or more truss pipes of the truss itself can no longer be sustained and have to be replaced with two or more internal lengthways support pipes, which run parallel with the two or more truss pipes of the truss itself but are more centrally located in the truss and are held by one or more intermediate plates, the plane of which is perpendicular to the support pipes, at an equal distance from each other and at an equal distance to the truss pipes of the truss itself.

All the intermediate plates and the more centrally arranged support pipes in the longitudinal direction of the truss strengthen the stability of the truss which is now no longer strengthened anymore by the original cross members between the truss pipes.

In a preferred embodiment the mounting structures consist of mounting pipes, parallel to the parallel truss pipes of the truss and to which objects to be suspended can be attached by means of clamps, hooks or other fasteners, without damaging the truss itself.

In an alternative embodiment the mounting structures consist of rods, parallel to the parallel truss pipes of the truss, on which objects can be slid to be suspended or stacked. These objects can be utilitarian objects such as light fixtures or parts of a sound installation, but can also be commercial messages, displays or other objects still.

An advantage of this embodiment is that the objects on the rods can be easily replaced, without having to dismantle the load-bearing truss.

In a more specific embodiment, the one or more mounting pipes are themselves part of a scaffolding structure and are scaffolding pipes which can be used as a support, for example when working on a façade.

An advantage of this embodiment is that the whole scaffolding structure with trusses and scaffolding pipes can be attached to each other with double clamps and single clamps, as is customary in scaffolding.

In a preferred embodiment the connecting elements consist of connection sheets which hold the parallel truss pipes at a fixed distance from each other. Preferably these connection sheets are in a plane, perpendicular to the longitudinal axis of the truss and can consist of two terminal connection sheets on the truss.

BRIEF DESCRIPTION OF THE DRAWINGS

With the intention of better showing the characteristics of the invention, a few preferred embodiments of the device for strengthening and rigging trusses according to the invention are described hereinafter by way of an example, without any limiting nature, with reference to the accompanying drawings, wherein.

DESCRIPTION OF THE PREFERRED EMBODIMENTS

Figure 1:
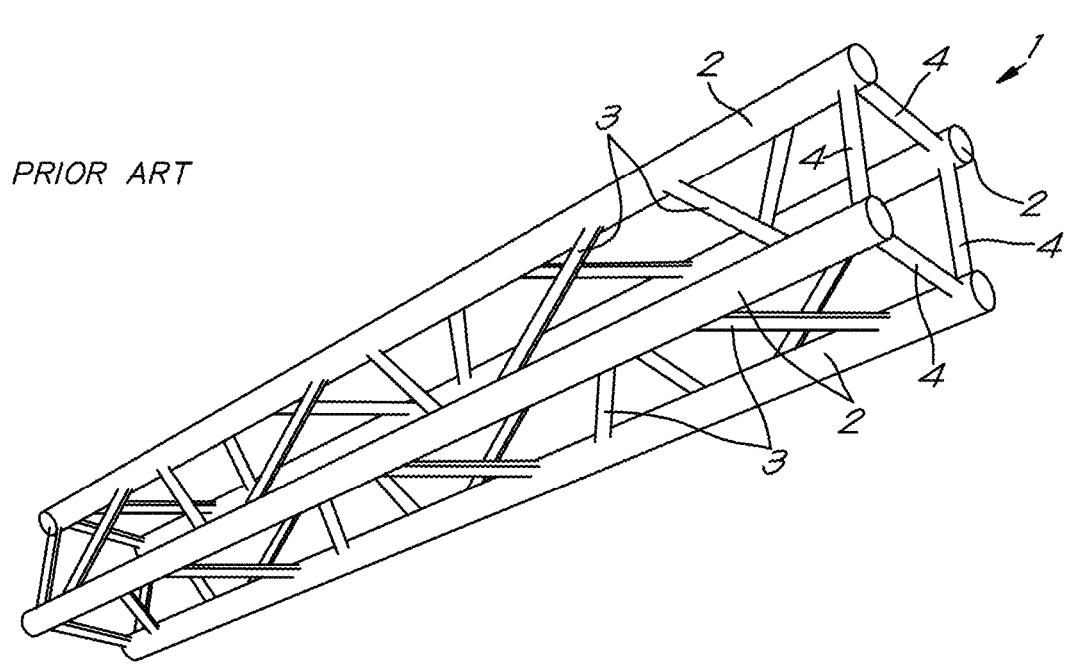
FIG. 1 schematically shows a perspective view of a truss according to the known state of the art.

FIG. 1 schematically shows a truss 1 according to the known state of the art, consisting of four truss pipes 2 in this case which run parallel with each other and are connected with each other by cross members 3 such that the truss pipes 2 are held an equal distance 4 from each other.

Figure 2:
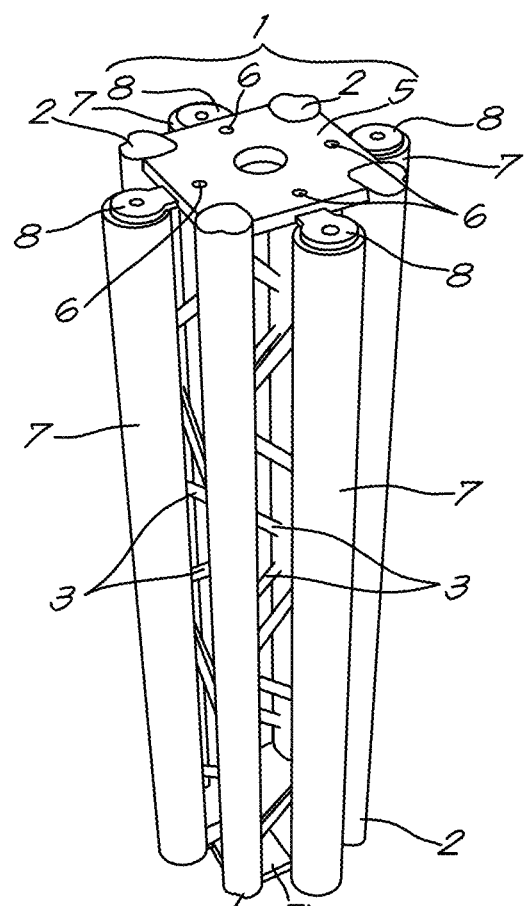
FIG. 2 schematically shows a perspective view of a truss provided with a device according to the invention.

FIG. 2 shows a truss 1 with four truss pipes 2, which run parallel with each other and are connected with each other by cross members 3, but which is now provided with a device according to the invention, consisting of two connecting elements 5, 5' and in this case terminal connection sheets which each connect the four truss pipes 2 with each other and are provided with attachment means 6 between each pair of truss pipes 2, on which mounting structures 7 are attached by means of connectors 8 such that in this case the mounting structures 7 in the form of mounting pipes are located entirely outside the volume of the truss 1.

Figure 3:
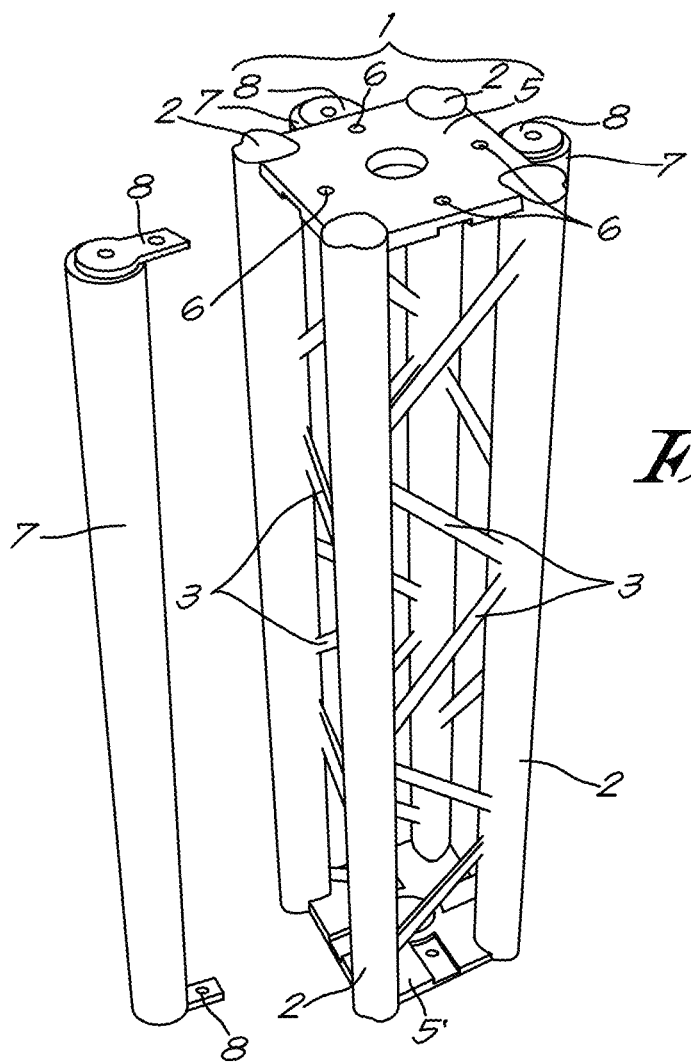
FIG. 3 shows FIG. 2 but with uncoupled mounting pipes.

FIG. 3 shows FIG. 2, but now with two of the four mounting structures 7 uncoupled from the truss 1 such that the original cross members 3 between the four truss pipes 2 of the truss 1 are well visible as well as the connectors 8 which connect the mounting structures 7 with the attachment means 6 on the terminal connecting elements 5, 5'.

Figure 4:
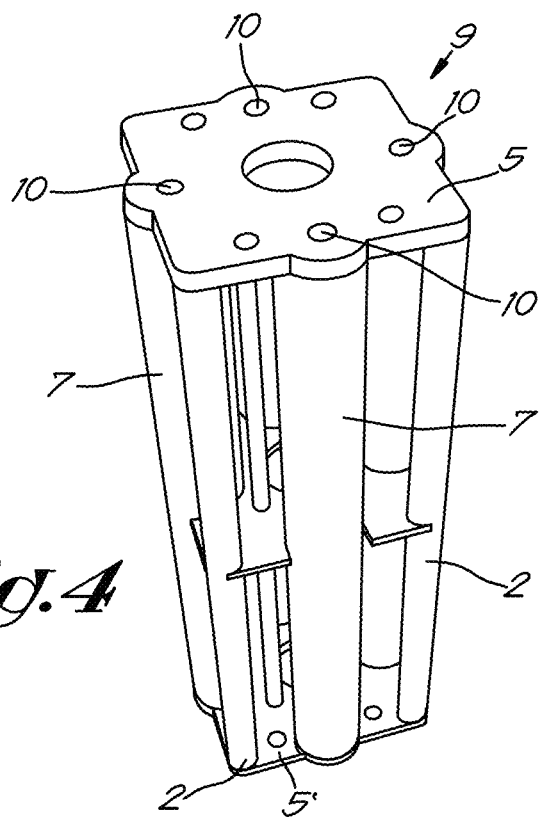
FIG. 4 schematically shows a variant of FIG. 2.

FIG. 4 shows a variant 9 of the device according to the invention in FIG. 2, whereby the attachment means 10 on the connecting elements 5, 5' form a direct connection with the mounting structures 7 without the connectors 8, such that in this case the mounting structures 7 in the form of mounting pipes are only located partially outside the volume of the truss 1. By this placement of the mounting structures 7, the traditional cross members 3 of the truss 1 can no longer be sustained and they have been replaced with another supporting structure 11, as described in: ???

Figure 5:
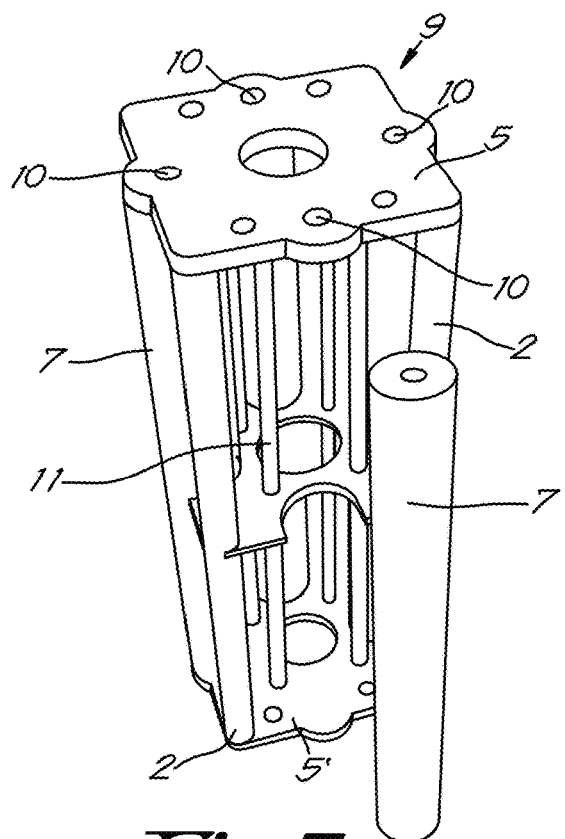
FIG. 5 shows FIG. 4 but with one uncoupled mounting pipe.
Figure 6:
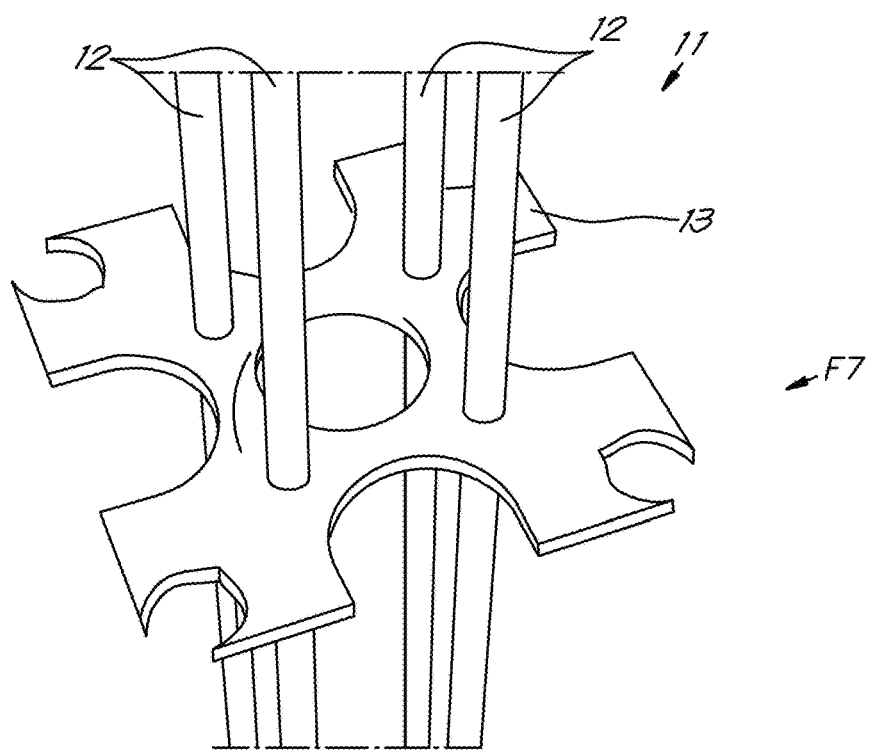
FIG. 6 shows the cross members between the four truss pipes of the truss in FIG. 4.

FIG. 5, in which one of the mounting structures 7 has been unfastened from the truss 1, such that the supporting structure 11 is more visible. This supporting structure 11 is shown separately in FIG. 6 and consists of four support pipes 12 in this case which run parallel but more centrally with the four truss pipes 2 of the truss 1 and are held by an intermediate plate 13, the plane of which is perpendicular to the support pipes 12, at an equal distance from each other and at an equal distance to the truss pipes 2 of the truss 1 itself.

Figure 7:
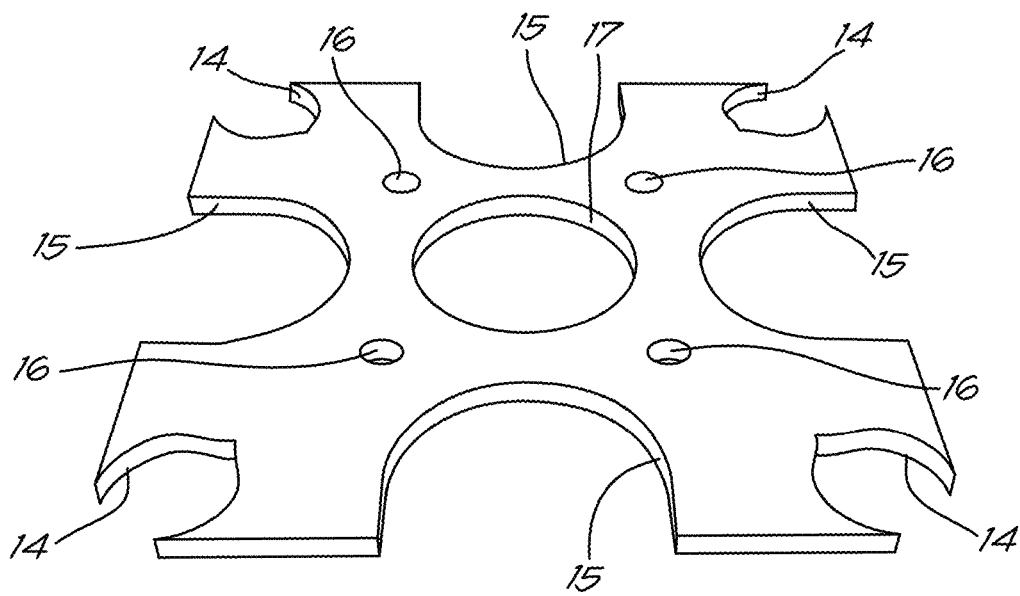
FIG. 7 shows a component indicated with F7 on FIG. 6 on a larger scale.

FIG. 7 shows an intermediate plate 13 of the supporting structure 11 on a larger scale whereby the intermediate plate has four recesses 14, in which the truss pipes 2 of the truss 1 fit, four recesses 15, in which the mounting structures 7 can be partly included, four support points 16 for the support pipes 12 and one central opening 17 between the support points 16.

Figure 8:
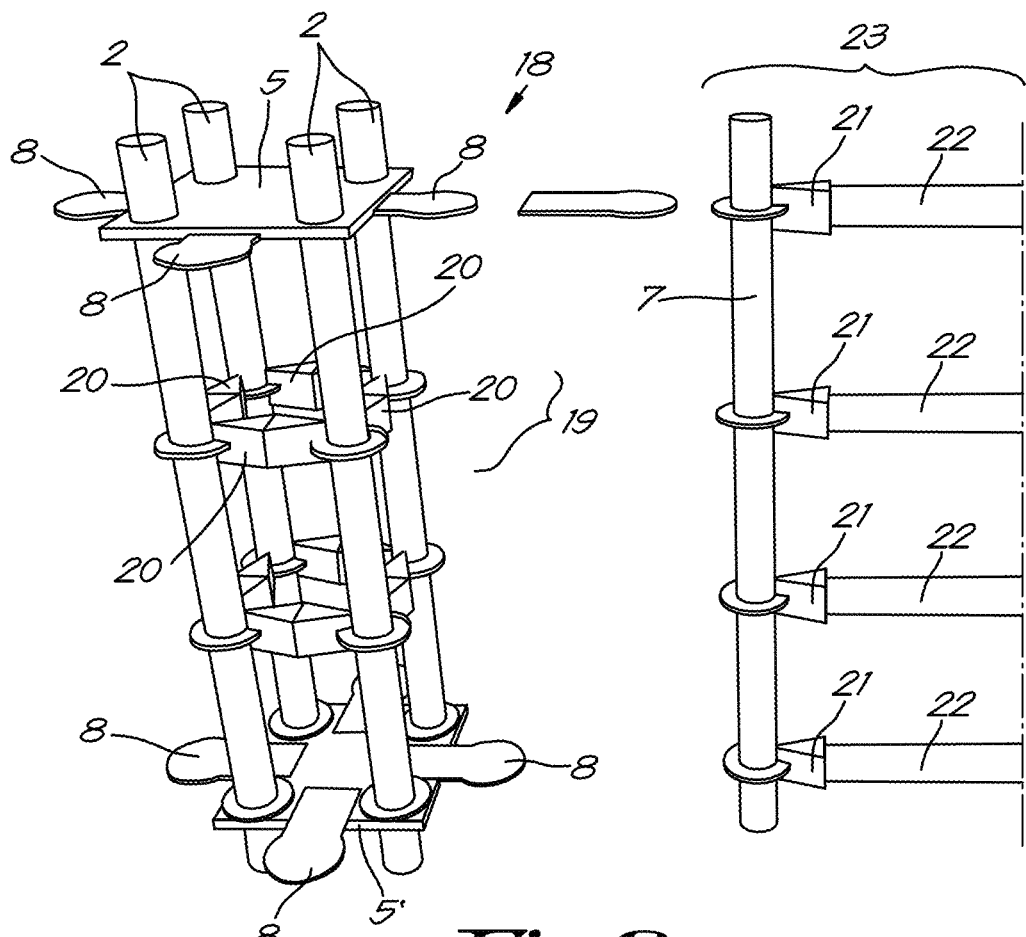
FIG. 8 schematically shows a perspective view of another variant of FIG. 2 with other cross members between the pipes of the truss.

FIG. 8 shows another variant 18 of the device according to the invention in FIG. 2, whereby the connecting elements 5, 5 are terminal connection sheets in this case which form a connection with the mounting structures 7 by means of connectors 8, such that in this case the mounting structures 7 in the form of mounting pipes are located entirely outside the volume of the truss 1. The strengthening cross members 3 between the truss pipes 2 of the truss 1 are replaced in this case with one or more intermediate virtual planes 19 which run parallel with the terminal connection sheets 5, 5', whereby the virtual planes 19 are formed by mechanical double clamps 20 between each pair of the three or more truss pipes 2, which hold the three or more truss pipes of the truss 1 at an equal distance from each other.

In this case the mounting structure 7 attached to the truss is a mounting pipe, which is itself part of a scaffolding because it is attached with single clamps 21 to scaffolding pipes and whereby the truss 1 serves as support element for a scaffolding 23 which can be used as a support, for example when working on a façade.

Figure 9:
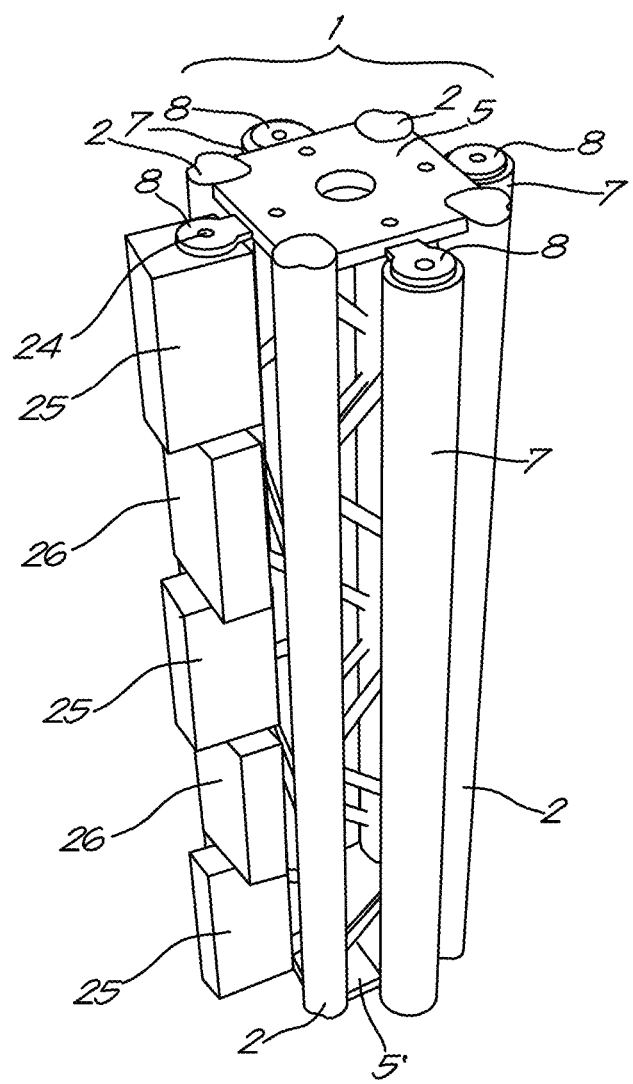
FIG. 9 shows an application of FIG. 2.

FIG. 9 shows an application of a truss 1 provided with a device according to the invention. In this application one mounting pipe has been replaced with a bar 24, over which a number of publicity panels 25 with commercial messages and displays 26 have been slid.

Figure 10A:
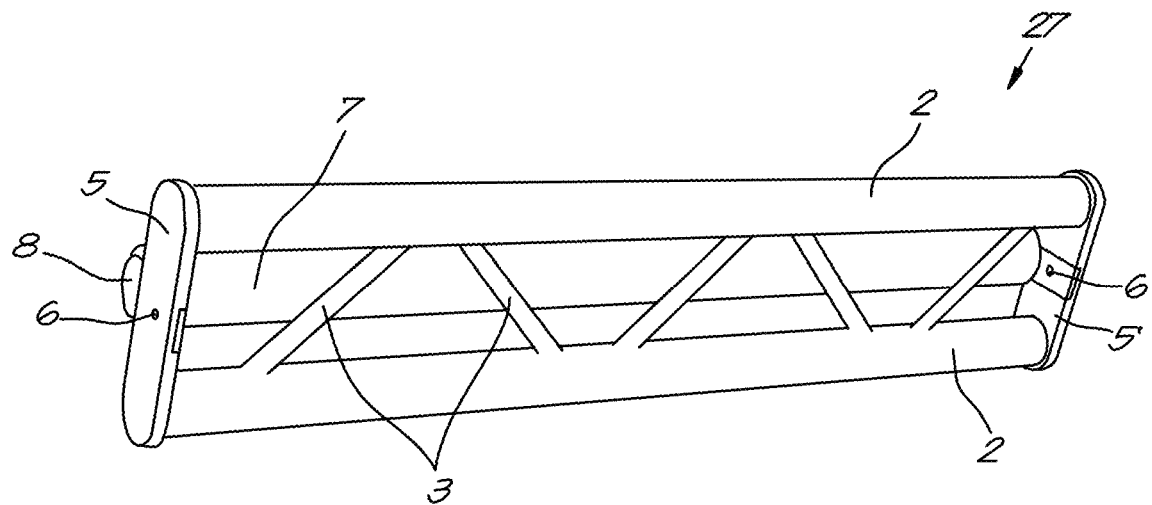
FIGS. 10A and 10B schematically show a variant of FIG. 2.
Figure 10B:
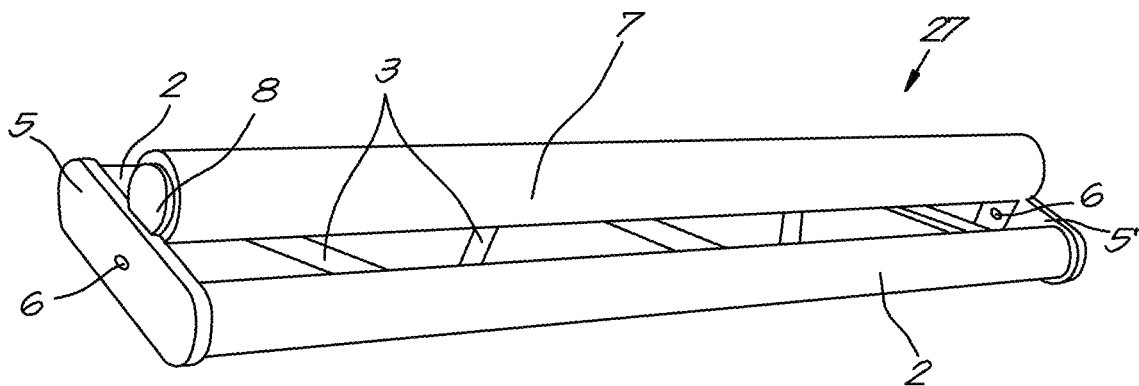

FIGS. 10A and 10B show another variant embodiment of the device according to the invention in FIG. 2, whereby the truss 27 only has two truss pipes 2, which run parallel to each other and are connected with each other by cross members 3 and are provided with a device according to the invention, consisting of two terminal connecting elements 5, 5' which each connect the two truss pipes 2 with each other and are provided with attachment means 6 between the pair of truss pipes 2, on which a mounting structure 7 is attached by means of connectors 8, such that in this case the mounting structure 7 in the form of a mounting pipe is partly located inside the volume of the truss 27. FIG. 10a shows a bottom view and FIG. 10b shows a top perspective view of this variant embodiment provided with one mounting pipe 7.

A device according to the invention, comprising two or more truss pipes 2 that are connected by connecting elements 5, 5' and optionally also by one or more intermediate plates 13, is preferably provided with a central opening 17 in said connecting elements 5, 5' and in said optional intermediate plates 13, through which wires can be pulled unhindered over the whole length of the truss 1.

The method for the use of the device 1 according to the invention is very simple and comprises the following steps:

setting up a temporary structure by connecting a number of trusses, which are provided with connecting elements on which attachment means are provided between each pair of truss pipes of the trusses.

applying one or more mounting structures per truss, depending on the needs, to the chosen attachment means, to which the objects to be suspended can be attached;

attaching the objects to be suspended to the one or more mounting structures with hooks or fastenings or still other attachment means;

using the temporary structure built including the accessories suspended or attached to it;

disassembling again the temporary structure built, whereby the mounting structures are removed from the truss skeleton without damaging the trusses or their cross members;

storing the trusses and mounting structures for reuse in another temporary set-up.

The mounting structures can differ depending on the needs and in their simplest form may consist of a mounting pipe or a mounting bar, on which all kinds of objects can be fastened.

These mounting structures may also consist of holders which, more specifically, are designed for certain objects or which are provided with hooks or fasteners which can be suitable for all kinds of applications. These mounting structures are always attached to the attachment means provided for this purpose, for example a pair of screw bolts, such that they not only strengthen the structure of the truss but also protect it against damage and overloading.

It goes without saying that the trusses do not always have to be straight but can also be curved or circular.

Obviously, the connecting elements provided with attachment means can also be placed in such a way that they do not obstruct the traditional couplings between two trusses, such as for example a perpendicular coupling of a horizontal truss to a vertical truss.

The present invention is by no means limited to the embodiments described as an example and shown in the figures, but a device according to the invention can be realised in all kinds of forms and dimensions without departing from the scope of the invention, as is described in the following claims.

The invention claimed is:

1. A device for connecting at least four truss pipes of a truss, the device comprising:
    at least two connecting elements configured to connect the at least four truss pipes of the truss, the at least two connecting elements consisting of connection sheets configured to hold the at least four truss pipes at a fixed distance from each other, the connection sheets configured to extend from and between each of the at least four truss pipes in a plane perpendicular to the longitudinal axis of the truss;
    attachment devices respectively configured to be provided between at least one pair of the at least four truss pipes, the attachment devices configured to attach respective mounted structures thereto, the attachment devices being disposed on respective ones of the connecting elements; and
    terminal connectors configured to attach the mounted structures to the attachment devices such that the mounted structures are located entirely outside the volume of the truss,
    wherein the at least two connecting elements are configured to retain one or more intermediate virtual planes that are parallel with the connecting elements, the one or more intermediate virtual planes being formed by mechanical double clamps between the at least one pair of the at least four truss pipes, the mechanical double clamps configured to hold the at least four truss pipes of the truss at an equal distance from each other.

2. The device according to claim 1, wherein the mounted structures consist of mounted pipes, which are parallel with the at least four truss pipes of the truss.

3. The device according to claim 2, wherein the mounted pipes are part of a scaffolding structure to which the truss is attached, the truss serving as a support element for the scaffolding structure.

4. The device according to claim 1, wherein the mounted structures consist of rods, parallel with the at least four truss pipes, on which objects are configured to be slid to be suspended or stacked.

5. The device according to claim 1, wherein the connection sheets are terminally-disposed on the truss.

6. The device according to claim 1, wherein the at least four truss pipes are connected by the connecting elements, said connecting elements being provided with a central opening through which wires are able to be pulled unhindered over the whole length of the truss.

7. A method for applying the device according to claim 1, the method comprising:
    setting up a temporary structure by connecting a plurality of trusses that are each provided with the at least two connecting elements on which the attachment devices are provided between each pair of the at least four truss pipes;
    applying one or more of the mounted structures for each of the trusses to the respective attachment devices to which objects to be suspended are able to be attached;
    attaching the objects to be suspended to the one or more mounted structures with clamps, hooks or other attachment devices;
    using the temporary structure that is set up, the temporary structure including accessories suspended or attached to the temporary structure;
    disassembling the temporary structure that is set up by removing the mounted structures from the truss without damaging the trusses or cross members of the trusses and
    storing the trusses and the mounted structures for reuse in another temporary set-up.

8. The device according to claim 1, wherein the connection sheets each have at least four edges, each of the edges connecting two of the at least four truss pipes.

* * * * *